United States Patent
Weitbruch (10) Patent No.: US 6,366,706 B1
(45) Date of Patent: Apr. 2, 2002

(54) METHOD AND APPARATUS FOR AUTOMATIC ASPECT FORMAT DETECTION IN DIGITAL VIDEO PICTURES

(75) Inventor: Sébastien Weitbruch, Mönchweiler (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/173,058

(22) Filed: Oct. 15, 1998

(30) Foreign Application Priority Data

Oct. 28, 1997 (EP) .............................. 97118679

(51) Int. Cl.⁷ ................................ G06K 9/40
(52) U.S. Cl. ................. 382/254; 382/260; 348/441; 348/445; 348/556
(58) Field of Search .................. 348/441, 445, 348/556, 913; 382/254, 260, 264

(56) References Cited

U.S. PATENT DOCUMENTS

| | | | |
|---|---|---|---|
| 5,249,049 A | * 9/1993 | Kranawetter et al. | 348/913 |
| 5,347,318 A | * 9/1994 | Kobayashi et al. | 348/556 |
| 5,400,077 A | * 3/1995 | Cookson et al. | 348/556 |
| 5,486,870 A | * 1/1996 | Decreamer | 348/556 |
| 5,486,871 A | * 1/1996 | Filliman et al. | 348/556 |
| 5,699,123 A | 12/1997 | Ebihara et al. | 348/445 |
| 5,784,123 A | * 7/1998 | Yoshimi | 348/556 |
| 5,914,754 A | * 6/1999 | Kori et al. | 348/556 |
| 5,956,092 A | * 9/1999 | Ebihara et al. | 348/445 |
| 6,115,072 A | * 9/2000 | Vuong et al. | 348/445 |

FOREIGN PATENT DOCUMENTS

| | | | |
|---|---|---|---|
| EP | 0675645 | 10/1995 | H04N/5/46 |
| EP | 0785676 | 7/1997 | H04N/5/44 |

OTHER PUBLICATIONS

Copy of European Search Report.
JP 07 170 425 A (Victor Co. of Japan Ltd.) Jul. 4, 1995.
Nakagaki N et al. "Wide Aspect TV Receiver With Aspect Detection and Non–Linear Control for Picture Quality" IEEE Transactions on Consumer Electronics, vol. 40, No. 3, Aug. 1, 1994, pp. 743–751, XP000471244.

* cited by examiner

*Primary Examiner*—Thomas D. Lee
(74) *Attorney, Agent, or Firm*—Joseph S. Tripoli; Joseph J. Laks; Harvey D. Fried (57) ABSTRACT

Analyzing steps are used for automatic aspect format detection in digital video pictures. A black bars analyzing step is performed wherein for each possible aspect format (14:9, 16:9, 2:1) a top and/or bottom area is defined and checked for whether a black bar is present. A center analysis also is performed to check whether an active picture area is present. A horizontal transition analysis determines whether a horizontal border between a dark area and the active part of the picture is present, and then a format choice is made and the picture aspect format is selected. The method can control zoom operation in a TV receiver with a 16:9 picture tube or can control the recording function of a video recording device, in combination with the appropriate apparatus.

21 Claims, 9 Drawing Sheets

METHOD AND APPARATUS FOR AUTOMATIC ASPECT FORMAT DETECTION IN DIGITAL VIDEO PICTURES

BACKGROUND OF THE INVENTION

The invention relates to the method and an apparatus for automatic aspect format detection in digital video pictures.

Today, TV pictures sent by broadcasters could have different formats for the active picture (4:3, 14:9, 16:9, 2:1 . . . with or without sub-titles). When these aspect formats are transmitted in 4:3 video format, the pictures with aspect formats (14:9, 16:9, 2:1 . . . with or without sub-titles) are displayed on 4:3 TV screens with black bars. A very important function of today's 16:9 TV's, i.e. TV's with 16:9 picture tube, is the possibility to zoom the received picture in order to fill the screen and remove or reduce the black bars.

In PAL+ -TV standard there is provided a wide screen signalling information embedded in the video signal. In most other TV standards no wide screen signalling is provided. Therefore, in most of the TV's today, the zoom function is made manually by the user, but the user would be interested in an automatic or semiautomatic letterbox detection process which is capable of detecting the real active part of the screen in order to enable the TV to make the best zoom operation automatically. Advantageously this function has to respect the broadcasting of sub-titles with the possibility, in that case, to zoom the upper part of the screen only.

From document EP-A-0 716 542 a high precision aspect ratio auto-discrimination apparatus is known wherein it is described to detect the upper edge and lower edge of a letter box picture by detecting the average luminance of every horizontal scan period and comparing it to the average luminance mean value of a defined region in the picture. The format aspect ratio of the picture is selected in dependence of the results of the upper and lower edge detection step.

While this algorithm is very simple, there exists the disadvantage that erroneous selection operations may result in case of dark scenes with some luminous parts in the middle of the picture (e.g., tunnel scenes, . . . ). In addition, the fact to use a mean value for defined upper, lower and center regions could cover up the existence of sub-titles.

SUMMARY OF THE INVENTION

The object of the invention is to provide a robust algorithm for the automatic detection of the real active video format of the received video signal. The algorithm should provide the information which aspect format is present in the received video signal so that the zoom operation can be made accordingly.

In principle the method according to the invention has four steps: A black bars analyzing step; a center analyzing step; a horizontal transition analyzing step and a format choice step. This algorithm provides strong security when making a new decision concerning the aspect format selection and avoids unexpected or erroneous format changes. The algorithm is very simple and could be integrated in a chip at very low costs. The algorithm has very good behavior even in very noisy pictures (up to 21 dB for signal-to-noise ratio). The algorithm can react very quickly. In case of difficult pictures (dark pictures or too noisy picture—under 20 dB) the algorithm takes no new decision and waits for a good opportunity to make the right choice. The typical scenes which may damage the behavior of most of the known algorithms—e.g., a dark scene with a luminous center part like a tunnel scene—do not disturb the behavior of this algorithm since the condition of recognition of horizontal transitions is not satisfied.

Advantageous developments of and improvements to the method are possible by virtue of the measures evinced herein. It is possible to detect very quickly the presence of sub-titles in the video picture (less than one second) in order to avoid consumer disturbance. A pre-processing step reduces the impact of noise in the video picture without disturbing the important information for the letter box detection. Advantageous particular embodiments are provided concerning the black bars analyzing step, center analyzing step, the sub-title analyzing step and the horizontal transition analyzing step which are easy to implement. A binary digitization step within the horizontal transition analyzing step has the advantage of avoiding adverse impact of different luminance levels on the horizontal transition analyzing step.

A gradient computation step has the advantage to allow the classification of the pixels whether they are on the correct horizontal border line, on no border line or on a wrong horizontal border line. Particular details for the gradient computation step are given. A simple method evaluates the results of the gradient computation step to find the horizontal transitions. An aspect format is selected when the horizontal transitions are found and the presence of black bars and an active picture part in the center have been detected, depending on the number of active video lines counted between the horizontal transitions. The choice can be constrained to particular format choices. A counter can be provided to distinguish for each possible aspect format so that wrong switching operations to a new aspect format are avoided when scenes feign a new aspect format. When a new aspect format has been selected, a simplified algorithm is performed wherein the ongoing presence of black bars is checked for the selected format.

BRIEF DESCRIPTION OF THE DRAWING

Exemplary embodiments of the invention are illustrated in the drawings and are explained in more detail in the following description. In the figures.

DESCRIPTION OF THE PREFERRED EMBODIMENTS

A typical letter box format has black bars in the bottom and upper part of the picture and strong horizontal transitions between these black bars and the rest of the picture. Moreover, a letter box picture with sub-titles is characterised by very high luminance levels in the bottom black bar.

Figure 1:
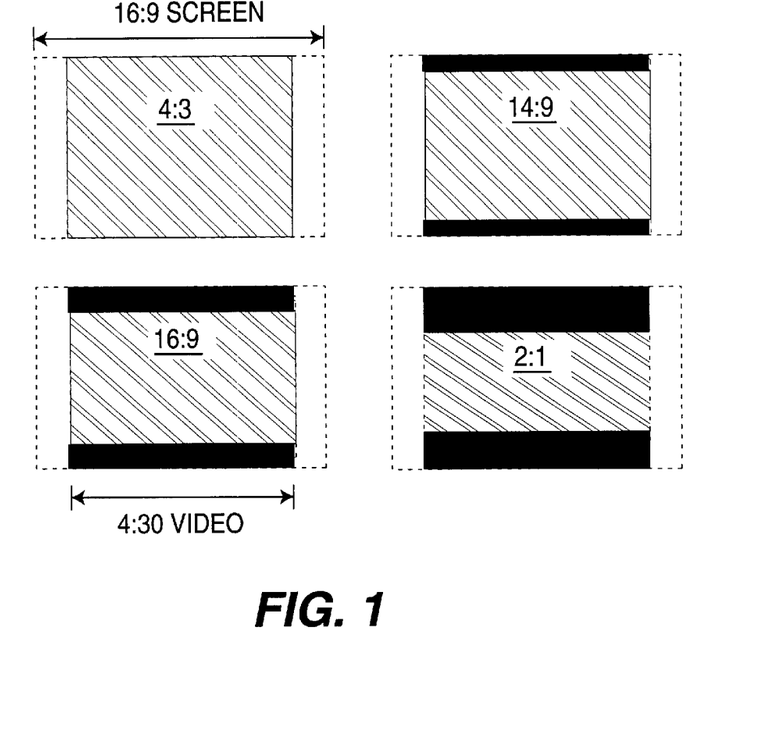
FIG. 1 shows 4 possible video pictures with different aspect formats in the active video part.

FIG. 1 shows 4 possible video formats for 4:3 video pictures. They are named 4:3 format, 14:9 format, 16:9 format and 2:1 format, respectively corresponding to the aspect ratio of the active video picture. It is useful to classify all possible video formats into these four basic formats. This simplifies the algorithm and makes the algorithm more robust. For the well known PAL system the following definitions are made:

The picture has the 4:3 format when the number of active lines is between 576 and 527;

the picture has the 14:9 format when the number of active lines is between 526 and 463;

the picture has the 16:9 format when the number of active lines is between 462 and 405 and the picture has the 2:1 format when the number of active lines is under 405. In addition, all the formats 14:9, 16:9, and 2:1 may have sub-titles in the bottom black bar and in these cases the automatic zoom operation in TV receivers with 16:9 tube should be performed in such a manner that only the upper black bar is cut off.

Figure 2:
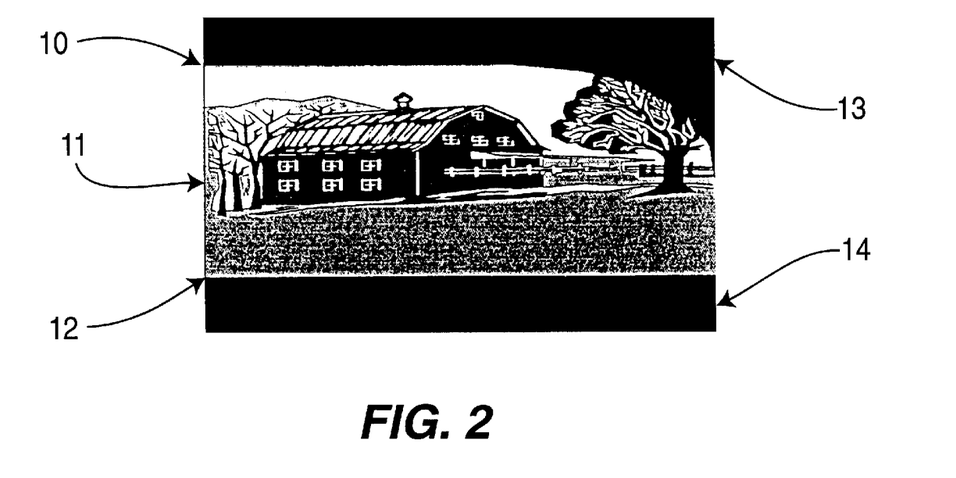
FIG. 2 shows a letter box video picture for the explanation of important parts in the picture.

In FIG. 2 reference number 10 denotes a horizontal transition which is present in a part of the picture only. Reference number 11 denotes an active picture part in the center. Reference number 12 denotes a horizontal transition on the whole picture width. Reference number 13 represents the top black bar and reference number 14 denotes the bottom black bar.

Figure 3:
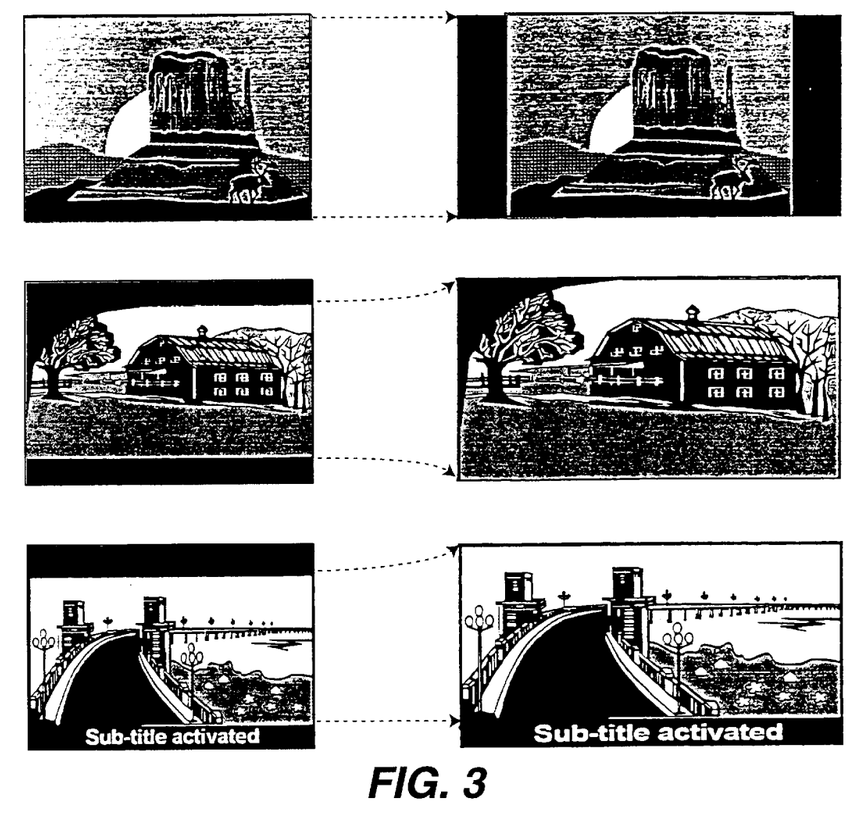
FIG. 3 shows an illustration of the zoom operation for different picture formats.

FIG. 3 shows an illustration of the zoom operation for different formats. The first picture shown has 4:3 format. Here, no zoom operation is being carried out in order to avoid a distinct distortion of the picture. The second picture shown has 16:9 format. The zoom operation will be performed in this case without producing a distortion in the displayed picture. No black bars will appear in this case in the video picture displayed on a 16:9 type display. The third picture shown has 16:9 format with active sub-titles in the bottom black bar. Here, the zoom operation is restricted to the upper part of the picture in order not to suppress the sub-titles. It is noted, that the zoom operation itself is not part of this invention, because solutions for powerful zoom operations are already existing and known by the skilled man.

In general words the algorithm according to the invention has to be able to detect a new special format when a new video sequence is started or the TV receiver is switched to a new channel, etc. This information is supplied to the digital video processing state performing the zoom function. In this situation a very dependable decision is needed to avoid erroneous or unexpected format changing. Second, the algorithm must be capable of analyzing in a simple manner whether a new selected format is stable or not. In addition, there is a need for analyzing for sub-titles in the pictures.

This detection will be active the whole time and enable the algorithm to go into a sub-title format when suddenly, a sub-title is detected. Here, it is useful to stay in this format even if no further sub-title is detected.

Figure 4:
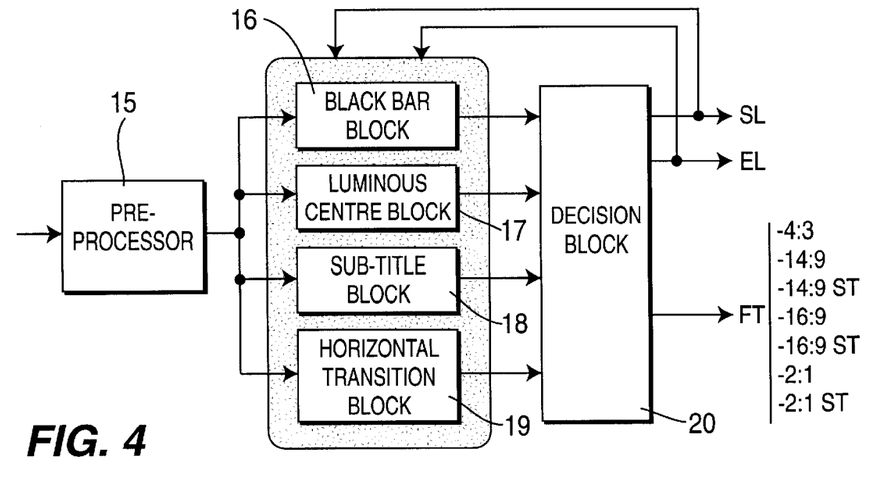
FIG. 4 shows a diagram which illustrates the functioning of the algorithm in form of blocks.

FIG. 4 shows the functioning of the algorithm in form of a block diagram. Reference number 15 denotes a pre-processing block. Reference number 16 stays for a black bars analyzing block. Reference number 17 indicates a center analyzing block. Reference number 18 denotes sub-title analyzing and reference number 19 denotes a horizontal transition analyzing block. With reference number 20 a decision block is indicated which receives the results of all previous analyzing blocks. Decision block 20 delivers the detected format type via output line FT. It also provides the information for start and end line of the active picture part via respective lines SL and EL. The format types 14:9 ST, 16:9 ST and 2:1 ST correspond to the formats with active sub-titles.

The functioning of all blocks will be described hereafter. The algorithm takes as input the luminance information of the picture.

Pre-processing block:

The idea of this block is to reduce a lot the impact of the noise without disturbing the important information's for the letter box detection.

To do that a strong horizontal low-pass filter (no reducing of the transitions between black bars and the rest of the pictures) is used. The mask of the low-pass filter may be the following filter mask:

$$\tfrac{1}{5}\cdot[1\,1\,1\,1\,1]$$

This filter mask indicates that two neighboring pixels to the right and to the left of one current pixel plus the current pixel are summed up and the result is divided by 5. The resulting value is the new value of the current pixel.

Figure 5:
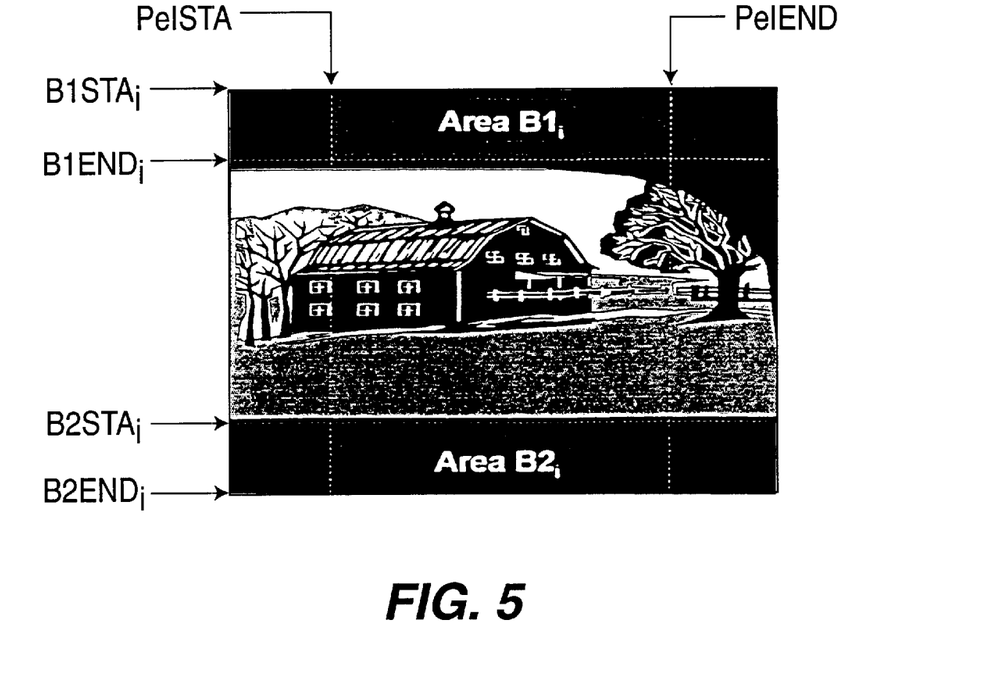
FIG. 5 shows an example of a letter box video picture for the explanation of the black bars analyzing step.

Black bars analyzing block:

For each possible format having black bars (14:9, 16:9 and 2:1) two areas are defined in which each pixel value is compared to a BLACKLEVEL reference value and then a black level counter is incremented for each area and each format when the pixel luminance value is below the BLACKLEVEL reference value. These areas are shown in FIG. 5 with hatched structure and indicated by reference symbols Area $B1_i$ and Area $B2_i$. The subscript value "i" shown in FIG. 5 is related to the three possible formats: 14:9(1) - 16:9(2) - 2:1(3) and so this block will output the two values B1Counti and B2Counti for each format. The end line B1ENDi and the start line B2STAi are initialized for a strong black bars analyzing step to the values corresponding to the biggest possible active area of each format. Afterwards, when a new format has been found, these values are corrected with the information of start and end line of the active picture part provided by the decision block 20 via the reverse directed lines. The pixel positions PelSTA and PelEND for the horizontal start and end of the black bars analyzing step are used to avoid disturbances from logos of program providers.

Figure 6:
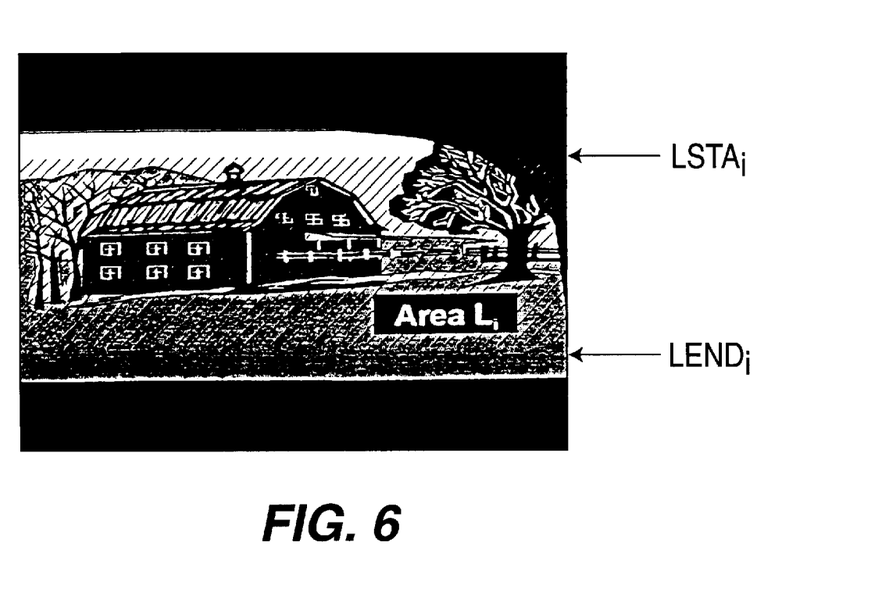
FIG. 6 shows an example of a letter box video picture for the explanation of the center analyzing step.

Center analyzing block:

For each possible format an area $L_i$ (see FIG. 6) located in the middle of the picture is defined in which the value of each pixel is compared to a LIGHTLEVEL reference value and a corresponding light level counter is incremented when a pixel value exceeds the LIGHTLEVEL reference value. A light level counter is provided for each possible format. The output of this block will be a value LCOUNTi which represents the amount of pixels having a value bigger than the LIGHTLEVEL reference value for each format. Here, also the start line LSTAi and end line LENDi are initialized for a strong center analyzing step to the values corresponding to the smallest possible active area of each format. Afterwards, when a new format has been found, these values are corrected with the information of start and end line of the active picture part provided by the decision block 20 via the reverse directed lines.

Sub-title analyzing block:

For the sub-title analyzing step, it is provided another counter which compares each pixel value in the area $B2_i$ defined in the black bars analyzing block to a VLIGHT-LEVEL reference value (Very Light Level). This will be done since sub-titles are mostly represented by very light luminance levels which can be detected this way. Also a very light level counter is provided which is incremented when a pixel value exceeds the VLIGHTLEVEL reference value. The sub-title analyzing block provides as an output the resulting values VLCOUNTi for each format.

Horizontal transition analyzing block:

This block aims to detect the presence of purely horizontal borders or frontiers between the black bars and the active part of the screen.

In order to detect this border and to avoid the impact of the different luminance levels, a binary digitization of the picture to be analyzed is performed. This is done by comparing each pixel with the black level reference value of the black bars analyzing step and assigning either the number "0" when the pixel value is below or equal to the black level reference or the number "1" when the pixel value is above the black level reference value.

Figure 7:
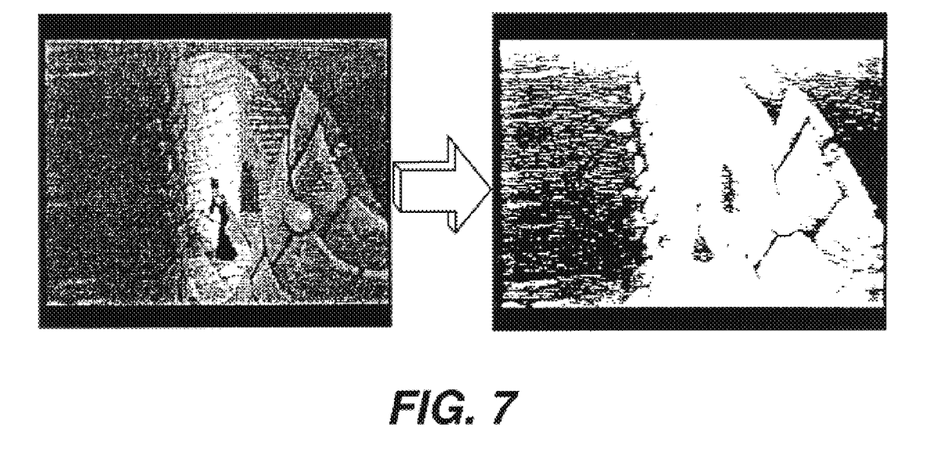
FIG. 7 shows a letter box video picture before and after a binary digitizing step.

FIG. 7 shows a picture before and after digitization. After the digitization step, only black and white pixels corresponding to the numbers "0" and "1" are present.

Next, a gradient computation step is performed on this digitized picture. Therein, it is computed per pixel of each line a value which indicates if this pixel is on a correct horizontal border or frontier, or not on a horizontal frontier, or on a horizontal frontier not corresponding to the correct horizontal frontier.

Figure 8:
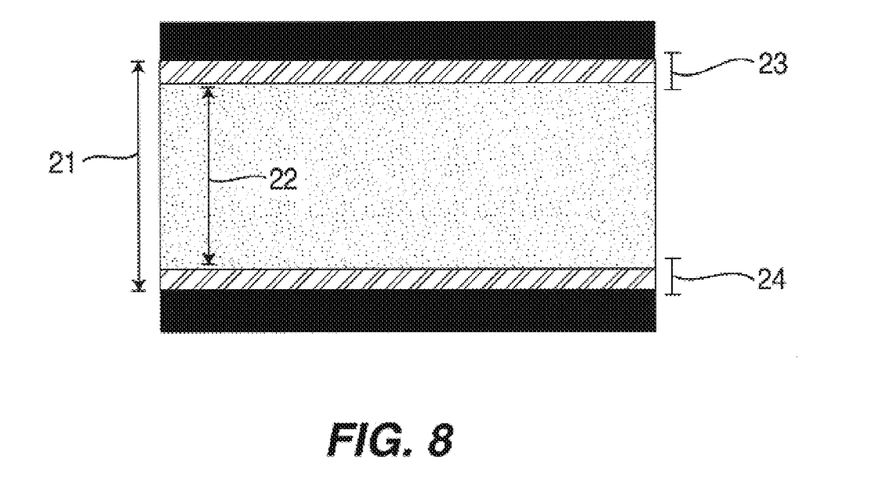
FIG. 8 shows the areas in a letter box video picture where a gradient computation step is performed.

In order to make this computation, a gradient analyzing area is defined for each format. This is shown in FIG. 8. Therein, reference number 21 corresponds to the biggest active picture area in format "i". Reference number 22 corresponds to the smallest active picture area in format "i". The gradient analyzing areas are denoted by reference numbers 23 and 24. They correspond to the difference areas between the biggest and smallest active picture areas for this format.

Figure 9A:
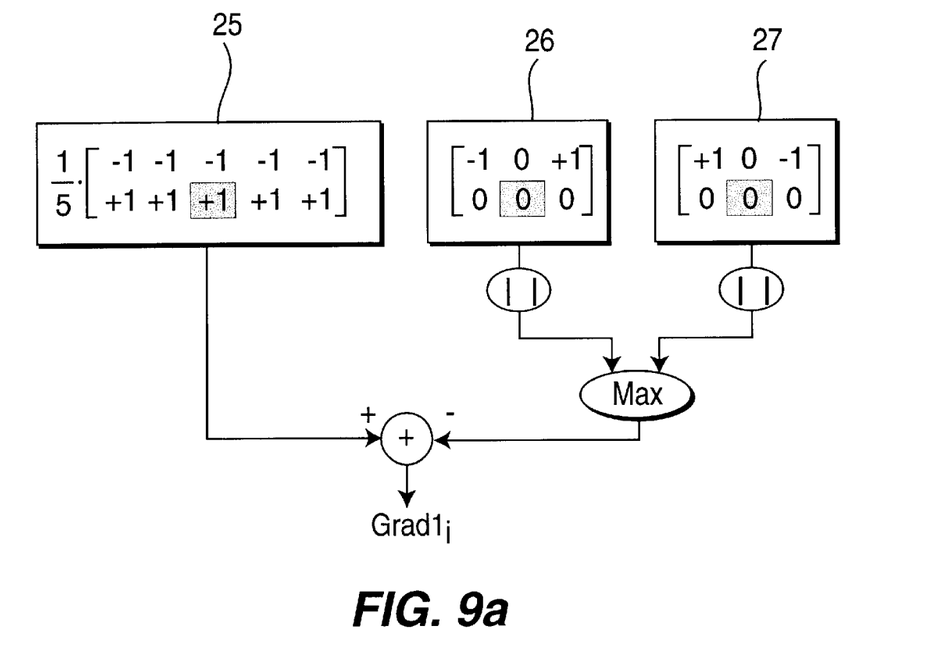
FIG. 9a) shows a first diagram for the explanation of the gradient computation step.
Figure 9B:
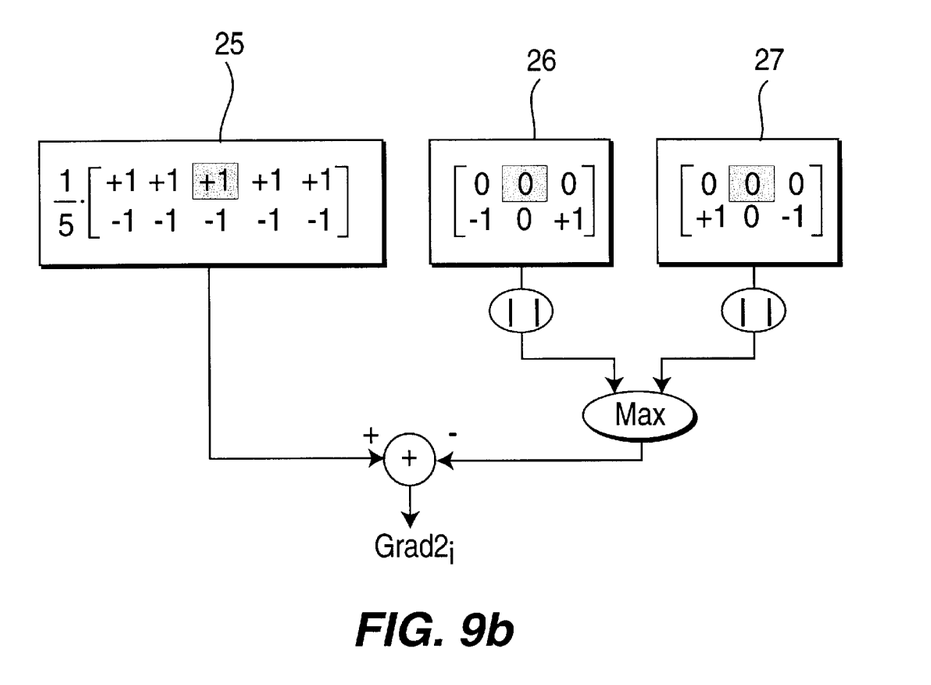
FIG. 9b) shows a second diagram for the explanation of the gradient computation step.
Figure 10A:
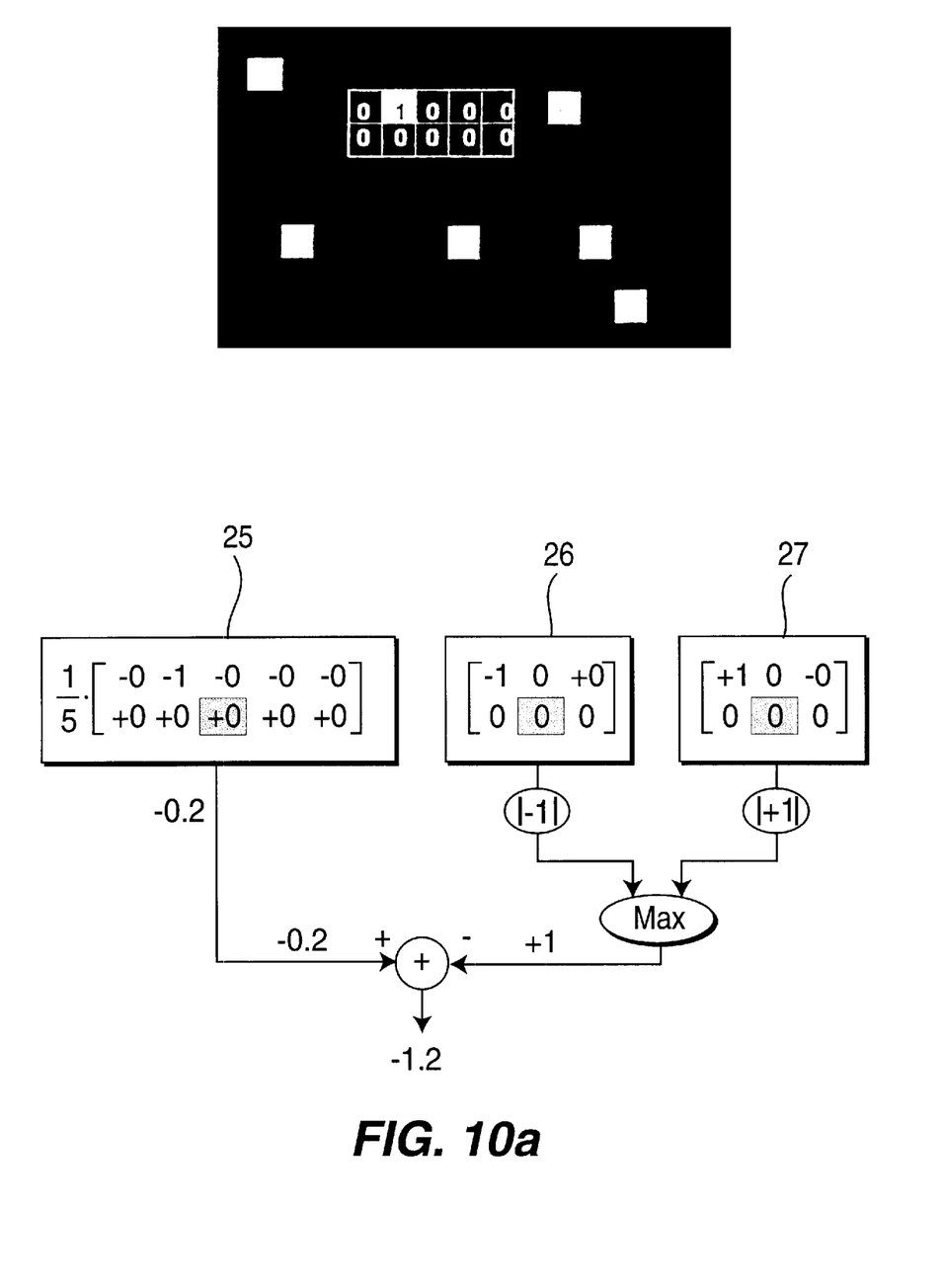
FIG. 10a) shows a first example illustrating the gradient computation step.
Figure 10B:
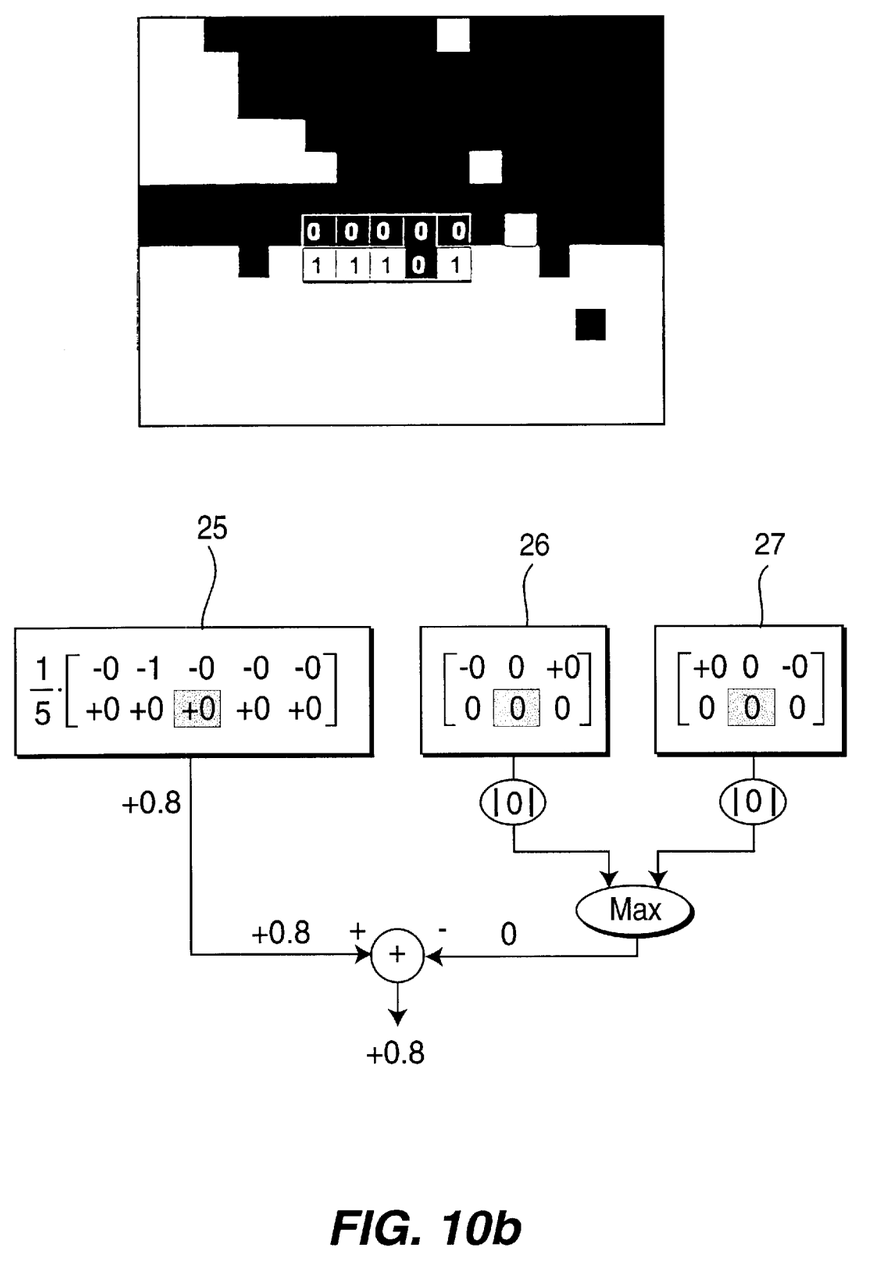
FIG. 10b) shows a second example illustrating the gradient computation step.

One possible example for the calculation of the gradient values is shown in FIG. 9. FIG. 9a shows the gradient computation step for the gradient analyzing area 23 shown in FIG. 8. FIG. 9b shows the gradient computation step for the gradient analyzing area 24 of FIG. 8. In block 25 of FIG. 9 is a 2×5 matrix which indicates that two neighboring pixels to the left and to the right of a current pixel and five pixels above these pixels are multiplied by the corresponding number "+1" or "−1". The results of all these multiplication operations are summed and multiplied by the factor ⅕ thus leading to a result which is fed to the adder shown in FIG. 9. The position of the current pixel with respect to the 2×5 matrix is indicated by a grey square in FIG. 9. In block 26 and 27 a 2×3 matrix is shown. The corresponding six pixel values including the current pixel are multiplied by the corresponding numbers shown in block 26 and 27. Once more, the results of the multiplication steps are summed and the absolute values of this results are calculated in the next computation stage below the blocks 26 and 27. Both absolute values are compared and the maximum value is selected in the following computation stage. The resulting value is subtracted from the resulting value of block 25 in the adder. The final result corresponds to the wanted gradient value. When the current pixel value is on a pure correct horizontal transition, the gradient value is "+1", when it is on a pure incorrect horizontal transition, the gradient value is "−1". The blocks 26 and 27 allow for a refined gradient value compared to where only the calculation according to block 25 is performed. Examples for this gradient calculation steps for concrete picture contents are shown in FIG. 10a) and 10b). In both parts of FIG. 10 the gradient calculation is performed based on the method according to FIG. 9a).

Figure 11:
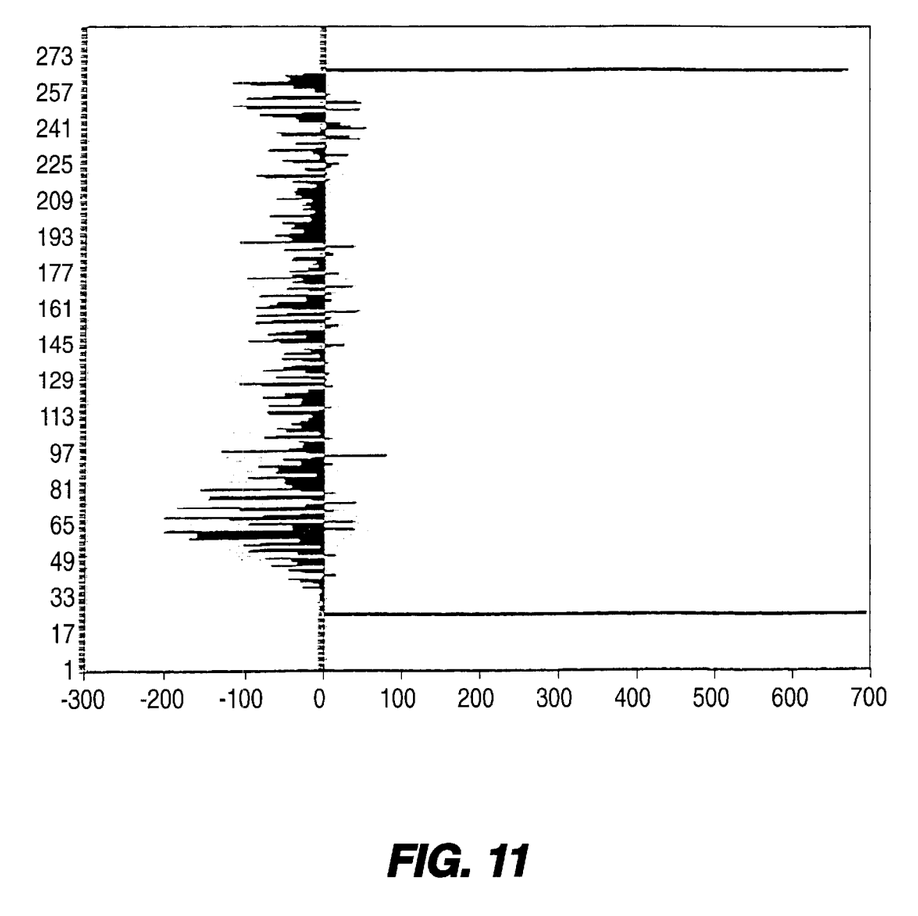
FIG. 11 shows the results of summing up all gradient values in each video line of a field.

The resulting gradient values are summed up per line which corresponds to count the number of good gradient (Grad1i and Grad2i positive) reduced by the number of other structures (Grad1i and Grad2i negative or zero). Then the biggest positive value gives an indication for the line number where a strong horizontal transition is likely to be. A minimum threshold value can be applied to detect strong horizontal transitions only. FIG. 11 illustrates this computation for a whole field of a picture. However, this computation is only necessary for the areas 23 and 24 shown in FIG. 8. The strong horizontal transitions are detected≈in lines 22 and 265. These lines correspond to the start SL and end line EL of the active picture part. Both line numbers appear at the output of block 19 in FIG. 4.

Figure 12:
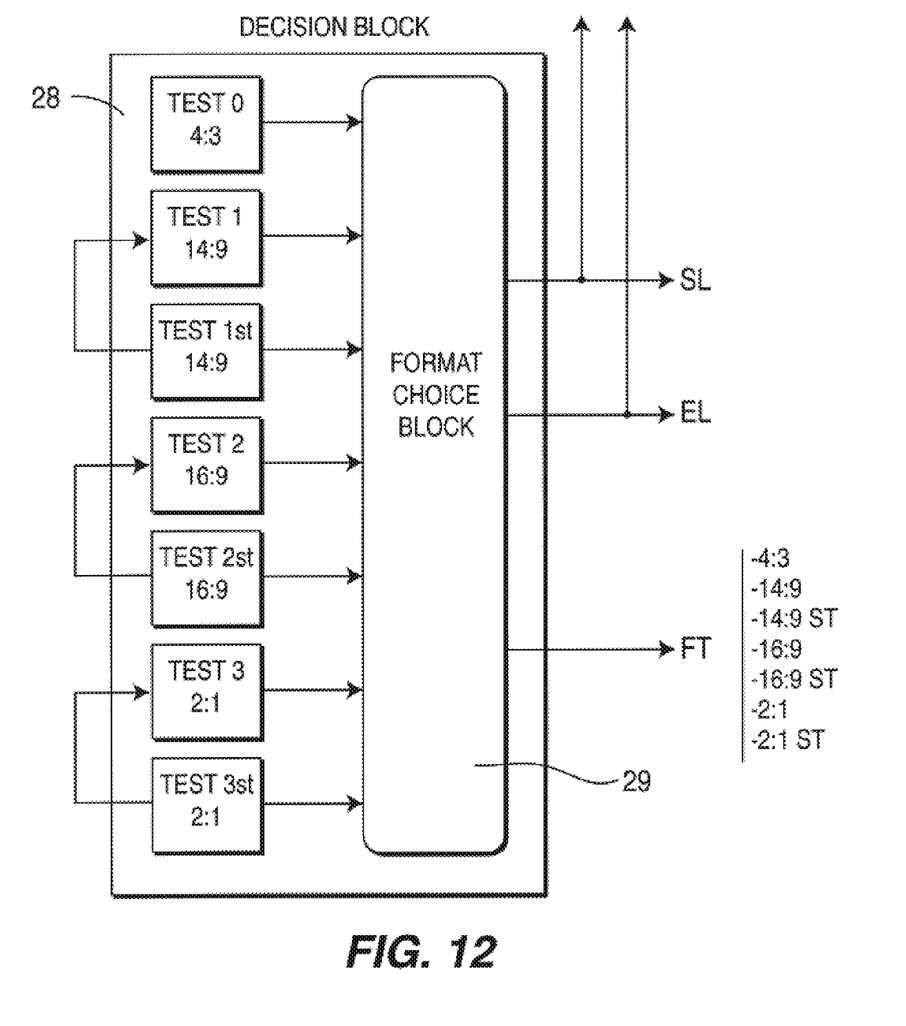
FIG. 12 shows the functioning of a decision block in form of blocks.

Decision Block:

The decision block is illustrated in FIG. 12. This block aims to take a decision (which kind of format is detected) with all the outputs coming from the previous blocks.

Therefore, seven tests are implemented. Test 0 checks whether 4:3 format is present in the picture. This test will be described last.

Test 1 corresponds to the test whether 14:9 format is present in the picture with no sub-titles.

Test 1st corresponds to the test whether 14:9 format is present in the picture with active sub-titles.

Test 2 corresponds to the test whether 16:9 format is present in the picture with no sub-titles.

Test 2st corresponds to the test whether 16:9 format is present in the picture with active sub-titles.

Test 3 corresponds to the test whether 2:1 format is present in the picture with no sub-titles.

Test 3st corresponds to the test whether 2:1 format is present in the picture with active sub-titles.

The tests 1, 2, 3 are positive when the following conditions are fulfilled:

When format i has not been recognized before:
  B1Counti and B2Counti should overtake defined values
  LCounti should overtake a defined value
  VLCounti should remain smaller than a defined threshold
  The pixels located on the two pure horizontal borders or frontiers (GradCount1i and GradCount2i) should be sufficient.

When format i has been recognized before:
  The values B1Counti and B2Counti should remain bigger than the defined values The tests 1st, 2st, 3st are positive when the following conditions are fulfilled:

When format "ist" has not been recognised:
  B1Counti should overtake a defined value
  LCounti should overtake a defined value
  VLCounti should overtake a defined threshold
  The pixels located on the two pure horizontal frontiers (GradCount1i and GradCount2i) should be sufficient.

When format i has been recognised before:

The values B1Counti should remain bigger than the defined value.

In addition, when an active sub-title has been detected, the tests concerning the same format without active sub-title are inhibited.

When none of the tests 1 to 3st was positive, test 0 generates a positive result.

Format choice block:

The format choice block is indicated with reference number 29 in FIG. 12. To make a choice, 7 counters are available in block 29. They correspond to the different tests Test0Count(4:3), Test1Count, Test1stCount, Test2Count, ... Each test will give as a result TRUE or FALSE. However, there will be only one TRUE result from all the tests for one picture. This TRUE value will increment the counter related to its test. Similarly, each counter increment resets all the other counters. Thus in fact a new format choice will be taken when one counter reaches an appropriate reference value. This value can be defined for different format switching behaviors (quickness and sensitivity of the algorithm).

As a remark, it is to say, that in case of active sub-titles in the picture, the algorithm is able to provide the real end line of the active part of the picture which enables the zoom operation stage to suppress the sub-title if the user has indicated that he does not want them.

The described blocks can be implemented by appropriate hardwired circuits or by corresponding computer programs. A lot of modifications of the described embodiments are possible and are regarded as being within the scope of the claims. For example, a lot of modifications for the gradient computation step are possible. The number of neighboring pixels could be varied. The matrices for the calculation of the gradient values could be modified. Optional rounding steps could be applied to reduce calculation power, etc.

When the algorithm works on pictures which are too dark for a good format choice, it waits for more luminous pictures to take its decision.

When a great amount of noise is present in the pictures, the algorithm has good behavior up to a signal-to-noise ratio of 21 dB. Under 20 dB, the algorithm has chosen security and as more noise is added, less correct format data is available However, the device preferably makes no false decision in that case but stays in 4:3 format, letting the consumer adapt the zoom operation by himself if desired.

Figure 13:
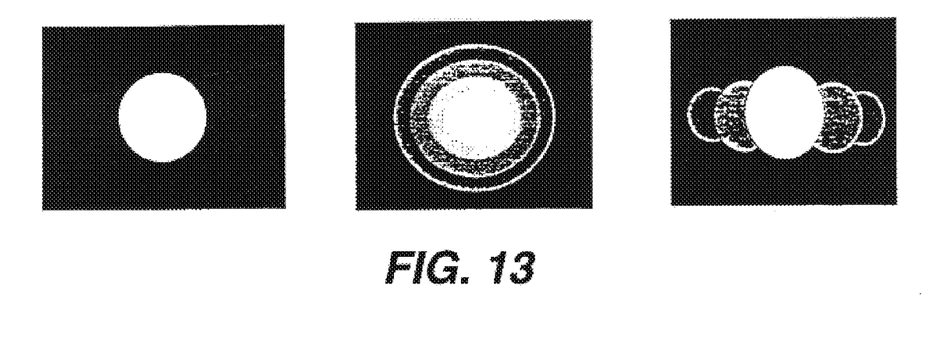
FIG. 13 shows typical video pictures which are difficult to analyze in view of the format detection.

Also a test has been made with typical pictures which produce problems with other algorithms like the pictures shown in FIG. 13. On such pictures, the format may not be detectable, and a letter box detector needs to wait before making a format decision. Thanks to the horizontal transition analyzing aspects, the algorithm described herein does not make a false decision and waits for a better sequence to take the right decision.

This algorithm can be used also in VCR's. There, the program can be saved e.g. in a 16:9 format according to the format choice step of the algorithm. This reduces loss of picture quality. Indeed, if a cinemascope film is stored in 4:3 format, the user has to make a zoom operation which will increase the impression of bad quality. But if the film is already stored in a cinemascope format, no further zoom is needed and the impression of quality is better.

What is claimed is:

1. Method for automatic aspect format detection in digital video pictures comprising:

a black bars analyzing step wherein for each of at least two possible aspect formats, at least one of a top and a bottom area is defined and analyzed as to whether a black bar is present or not;

a center analyzing step wherein for each of the possible aspect formats, a center area is defined and analyzed as to whether an active picture area is present or not;

a horizontal transition analyzing step comprising analyzing for whether or not a horizontal border is present between a dark area and the active part of the picture;

wherein a gradient computation step is performed which assigns to pixels a number that distinguishes among states in which a pixel is found to be on a correct horizontal border line, on no horizontal border line, or on a special structure not corresponding to the correct horizontal border line; and, a format choice step comprising selecting a picture aspect format as a result of said analyzing and gradient computation steps.

2. The method according to claim 1, further comprising a sub-title analyzing step wherein for each of the possible aspect formats, a bottom area is defined and analyzed for whether a light area is present or not.

3. The method according to claim 1, comprising a pre-processing step wherein a horizontal low-pass filtering operation is performed for the digital video picture.

4. The method according to claim 1, wherein in said one of the top and bottom area of the black bars analyzing step, each pixel value is compared to a black level reference value and a black value counter is incremented each time the pixel value is below the black level reference value, and wherein a black bar is detected as present when the black value counter exceeds a corresponding reference value.

5. The method according to claim 4, wherein in the bottom area of the black bars analyzing step, each pixel value is compared to a light level reference value and a light value counter is incremented each time the pixel value is above the light level reference value and wherein a sub-title is detected as present when the light value counter exceeds a corresponding reference value.

6. The method according to claim 1, wherein in said center area of the center analyzing step, each pixel value is compared to a light level reference value and a light value counter is incremented each time the pixel value is above the light level reference value, and wherein an active picture area is detected as present when the light value counter exceeds a corresponding reference value.

7. The method according to claim 6, wherein in the bottom area of the black bars analyzing step, each pixel value is compared to a light level reference value and a light value counter is incremented each time the pixel value is above the light level reference value and wherein a sub-title is detected as present when the light value counter exceeds a corresponding reference value.

8. The method according to claim 1, wherein in the horizontal transition analyzing step, a digitization step is performed in which each pixel value for pixels in a defined area is compared to the black level reference value and wherein a first of two numbers is assigned to the pixel when the pixel value is below the black level reference value and wherein the second of the two numbers is assigned to the pixel when the pixel value is above the black level reference value.

9. The method according to claim 1, wherein during the gradient computation step a number of neighboring pixels including pixels to the right and to the left of a current pixel and above these pixels of a current video line are analyzed.

10. The method according to claim 9, wherein the gradient computation step includes multiplying values of the neighboring pixels with numbers according to the following matrix and summing the resulting values, for the neighboring pixels comprising two pixels to the left and to the right of a current pixel in a current video line, the current pixel and five pixels of a video line above the current video line $$\left(\frac{1}{5}\right) \times \begin{bmatrix} -1 & -1 & -1 & -1 & -1 \\ +1 & +1 & +1 & +1 & +1 \end{bmatrix}.$$

11. The method according to claim 9, wherein the gradient computation step includes multiplying values of the neighboring pixels with numbers according to the following matrices and summing the resulting values respectively for each said matrix, for the neighboring pixels comprising one pixel to the left and to the right of a current pixel in a current video line, the current pixel and three pixels of a video line above the current video line, wherein the absolute values are determined for each sum and wherein the maximum value is selected from both absolute values for each sum $$\begin{bmatrix} -1 & 0 & +1 \\ 0 & 0 & 0 \end{bmatrix} \begin{bmatrix} +1 & 0 & -1 \\ 0 & 0 & 0 \end{bmatrix}.$$

12. The method according to claim 1, wherein during the gradient computation step a number of neighboring pixels are analyzed, including pixels to the right and to the left of a current pixel on a current video line and at least one of above and below the current video line.

13. The method according to claim 12, wherein the gradient computation step includes the step of multiplying values of the neighboring pixels with numbers according to the following matrix and summing the resulting values, for the neighboring pixels comprising two pixels to the left and to the right of a current pixel on a current video line, the current pixel and five pixels of the video line below the current video line $$\left(\frac{1}{5}\right) \times \begin{bmatrix} +1 & +1 & +1 & +1 & +1 \\ -1 & -1 & -1 & -1 & -1 \end{bmatrix}.$$

14. The method according to claim 12, wherein the gradient computation step includes the step of multiplying values of the neighboring pixels with numbers according to the following matrices and summing the resulting values for each said matrix, for the neighboring pixels comprising one pixel to the left and to the right of a current pixel on a current video line, the current pixel and three pixels of the video line below the corresponding pixels of the current video line, wherein the absolute values are determined for each sum and wherein the maximum value is selected from both absolutevalues for each said sum $$\begin{bmatrix} 0 & 0 & 0 \\ -1 & 0 & +1 \end{bmatrix} \begin{bmatrix} 0 & 0 & 0 \\ +1 & 0 & -1 \end{bmatrix}.$$

15. The method according to claim 1, wherein the numbers assigned to each pixel during the gradient calculation step are added per video line and the border lines are deemed to be at horizontal transitions at the video lines having the highest values.

16. The method according to claim 15, wherein
aspect format 4:3 is selected upon detection of a number of active video lines between 576 and 527 video lines;
aspect format 14:9 is selected, when the number of active video lines is between 526 and 463 video lines;
aspect format 16:9 is selected, when the number of active video lines is between 462 and 405 video lines;
aspect format 2:1 is selected, when the number of active video lines is under 405 video lines;
and the presence of black bars and an active picture area in the center have been detected.

17. Method for automatic aspect format detection in digital video pictures, comprising:
a black bars analyzing step wherein for each of at least two possible aspect formats, at least one of a top and a bottom area is defined and analyzed as to whether a black bar is present or not;
a center analyzing step wherein for each of the possible aspect formats, a center area is defined and analyzed as to whether an active picture area is present or not;
a format choice step comprising selecting a picture aspect format as a result of said analyzing steps; and,
wherein for each possible aspect format a counter is provided which is incremented when the corresponding aspect format is selected during the format choice step and reset when a non-corresponding aspect format is selected and wherein a new aspect format selection is determined to be valid when the counter for the new aspect format has reached a predetermined reference value.

18. The method according to claim 17, wherein a validation step is performed in order to detect whether the new aspect format selection is stable, the validation step comprising at least one of the black bars analyzing step and the sub-title analyzing step when no sub-title has been detected before.

19. Apparatus for automatic aspect format detection in digital video pictures comprising:
a black bars analyzing unit wherein for each of at least two possible aspect formats, at least one of a top and a bottom area is defined and analyzed as to whether a black bar is present or not;
a center analyzing unit wherein for each of the possible aspect formats, a center area is defined and analyzed as to whether an active picture area is present or not;
a horizontal transition analyzing unit operable to analyze whether a horizontal border between a dark area and the active part of the picture is present or not;
a gradient computation unit operable to assign to pixels a number that distinguishes among states in which a pixel is found to be on a correct horizontal border line, on no horizontal border line, or on a special structure not corresponding to the correct horizontal border line; and,
a format choice unit wherein a picture aspect format is selected due to outputs of the analyzing units.

20. The apparatus according to claim 19, in combination with a video recording device having a function for detection of the aspect format of recorded pictures in order to control at least one of a recording and display operation.

21. The apparatus according to claim 19, in combination with a television receiver having a function for detection of the aspect format of received video pictures in order to control a zoom operation for adaptation of the pictures to a display format.

\* \* \* \* \*